(12) United States Patent
Makhania et al.

(10) Patent No.: US 9,283,533 B1
(45) Date of Patent: Mar. 15, 2016

(54) CATALYST REGENERATORS AND METHODS FOR REGENERATING CATALYSTS

(71) Applicant: UOP LLC, Des Plaines, IL (US)

(72) Inventors: Minaz Makhania, Haryana (IN); Dharmesh Chunilal Panchal, Surbiton (GB); Patrick D. Walker, Park Ridge, IL (US)

(73) Assignee: UOP LLC, Des Plaines, IL (US)

( * ) Notice: Subject to any disclaimer, the term of this patent is extended or adjusted under 35 U.S.C. 154(b) by 11 days.

(21) Appl. No.: 14/468,740

(22) Filed: Aug. 26, 2014

(51) Int. Cl.
*B01J 38/40* (2006.01)
*B01J 23/90* (2006.01)
*B01J 8/30* (2006.01)
*B01J 38/34* (2006.01)

(52) U.S. Cl.
CPC .. *B01J 8/30* (2013.01); *B01J 38/34* (2013.01); *B01J 38/40* (2013.01); *B01J 2208/00938* (2013.01)

(58) Field of Classification Search
CPC .................................. B01J 38/40; B01J 23/90

USPC ............................................ 502/39; 422/223
See application file for complete search history.

(56) References Cited

U.S. PATENT DOCUMENTS

| | | |
|---|---|---|
| 5,198,397 A | 3/1993 | Raterman |
| 5,215,720 A | 6/1993 | Cetinkaya |
| 2012/0219467 A1 | 8/2012 | Palmas et al. |

*Primary Examiner* — Edward Johnson
(74) *Attorney, Agent, or Firm* — James C. Paschall

(57) ABSTRACT

Catalyst regenerators and methods of their use are provided. A method includes combusting coke from the catalyst in a second stage regenerator to produce a second flue gas, where the second stage regenerator includes a second combustion chamber and a top having a top cross-sectional area. The coke is partially combusted from the catalyst in a first stage regenerator with a first combustion chamber having a first combustion chamber cross-sectional area greater than the top cross-sectional area. The first stage regenerator is positioned above the top of the second stage regenerator. The first combustion chamber includes a cylindrical section directly over the top and an annular section surrounding the cylindrical section. The second flue gas is vented into the first stage regenerator through a vent tube, and a portion of the second flue gas is dispersed into the annular section of the first combustion chamber.

20 Claims, 3 Drawing Sheets

CATALYST REGENERATORS AND METHODS FOR REGENERATING CATALYSTS

TECHNICAL FIELD

The present disclosure generally relates to catalyst regenerators and methods regenerating catalysts using the same, and more particularly relates to two stage catalyst regenerators for residue fluid catalytic crackers and methods for regenerating catalysts using the same.

BACKGROUND

Fluid catalytic cracking (FCC) is primarily used to convert high boiling, high molecular weight hydrocarbons into lower boiling, lower molecular weight compounds. The lower molecular weight compounds include gasoline, olefinic compounds, liquid petroleum gas (LPG), diesel fuel, etc. An FCC unit typically uses a catalyst that is repeatedly deactivated and regenerated in a riser and a regenerator, respectively. Air is used to combust the coke from the deactivated catalyst in the regeneration process, and produces combustion gases such as carbon dioxide and water. Partial combustions gases like carbon monoxide may also be produced. Many FCC units use the energy generated from burning the coke from the catalyst to drive the endothermic reaction in the riser.

A residue fluid catalyst cracking (RFCC) unit is used to process residue feedstocks that tend to be higher molecular weight compounds than the feedstocks typically processed in FCC units. The residue typically produces more coke on the catalyst than vacuum gas oil or other typical FCC feedstocks, so more energy is produced when the coke is combusted. Many RFCC units include a two stage regenerator, where some of the coke is combusted from the catalyst in a first stage regenerator, and the remaining coke is combusted in a second stage regenerator. Some or all of the catalyst is cooled between the first and second stage regenerators to control the catalyst temperature, and thereby to maintain the energy balance between the regenerator and the riser.

A second flue gas from the second stage regenerator is vented into the first stage regenerator to provide some of the oxygen used in combustion, and additional air or other gases provide the remainder of the oxygen. The first stage regenerator often has a larger diameter than the second stage regenerator, and the first stage regenerator is positioned directly on top of a dome-shaped top of the second stage regenerator so some of the first stage regenerator is outside of the area directly above the top. In many traditional RFCC units the second flue gas is vented directly over the top of the second stage regenerator, and this extra gas increases the superficial gas velocity in the area over the top but not in the areas that are not over the top. The superficial gas velocity in the area directly over the top has been found to be up to about 2 to 3 times the superficial gas velocity in the area that is not directly over the top.

The catalyst is fluidized in the first and second stage regenerators, and catalyst loading in the flue gas increases exponentially with the superficial gas velocity. Catalyst is separated from a first flue gas in the first stage regenerator using cyclones, where the first flue gas is the total flue gas from the first and second stage regenerators. Catalyst in the flue gas is abrasive, and high catalyst loading is known to abrade equipment exposed to it. The higher superficial gas velocity in the area directly over the top has been found to entrain more catalyst and erode the cyclones and other equipment much more rapidly than in the area of the first stage regenerator that is not directly over the top.

Accordingly, it is desirable to provide catalyst regenerators and methods for regenerating catalyst that limit the abrasion of equipment in the first stage regenerator that is directly over the second stage regenerator. In addition, it is desirable to provide catalyst regenerators and methods for regenerating catalysts that reduce the superficial gas velocity directly over the second stage regenerator within the first stage regenerator. Furthermore, other desirable features and characteristics of the present embodiment will become apparent from the subsequent detailed description and the appended claims, taken in conjunction with the accompanying drawing and this background.

BRIEF SUMMARY

Catalyst regenerators and methods of using the same are provided. A method includes combusting coke from the catalyst in a second stage regenerator to produce a second flue gas, where the second stage regenerator includes a second combustion chamber and a top having a top cross-sectional area. The coke is partially combusted from the catalyst in a first stage regenerator with a first combustion chamber having a first combustion chamber cross-sectional area greater than the top cross-sectional area. The first stage regenerator is positioned above the second stage regenerator with the top separating the first and second combustion chambers. The first combustion chamber includes a cylindrical section directly over the top and an annular section surrounding the cylindrical section. The second flue gas is vented into the first stage regenerator through a vent tube, where the vent tube includes a discharge point. A portion of the second flue gas is dispersed into the annular section of the first combustion chamber by positioning the discharge point within the annular section, by venting the second flue gas from a side spout of the vent tube, or a combination thereof.

Another method is provided for regenerating catalyst. Coke is combusted from the catalyst in a second stage regenerator to produce a second flue gas, where the second stage regenerator includes a second combustion chamber and a top with a top cross-sectional area. The coke is partially combusted from the catalyst in a first stage regenerator to produce a first flue gas, where the first stage regenerator includes a first combustion chamber positioned above the second stage regenerator such that the top is between the first and second combustion chambers. The catalyst is separated from the first flue gas in a cylindrical cyclone positioned directly over the top within the first stage regenerator. Catalyst is also separated from the first flue gas in an annular cyclone positioned within the first stage regenerator beyond the area directly over the top. The second flue gas is vented into the first combustion chamber through a vent tube such that a superficial gas velocity at the cylindrical cyclone is about one to about one and a half times the superficial gas velocity at the annular cyclone.

A catalyst regenerator is also provided. The catalyst regenerator includes a first stage regenerator with a first combustion chamber having a first combustion chamber cross-sectional area. The catalyst regenerator also includes a second stage regenerator having a second combustion chamber with a top having a top cross-sectional area less than the first combustion chamber cross-sectional area. The first stage regenerator is positioned over the second stage regenerator such that a cylindrical section of the first combustion chamber is over the top and an annular section surrounds the cylindrical section. A plurality of vent tubes extends from the second combustion chamber into the first combustion chamber through the top, where a portion of the vent tubes include a discharge point within the annular section.

BRIEF DESCRIPTION OF THE DRAWINGS

Various embodiments will hereinafter be described in conjunction with the following drawing figures, wherein like numerals denote like elements, and wherein.

DETAILED DESCRIPTION

The following detailed description is merely exemplary in nature and is not intended to limit the application or uses of the embodiment described. Furthermore, there is no intention to be bound by any theory presented in the preceding technical field, background, brief summary, or the following detailed description.

Catalyst regenerators and methods for regenerating catalysts using the same are provided herein. Deactivated catalyst is transferred from a riser to a first stage regenerator in an RFCC unit, where some of the coke on the catalyst is combusted. Oxygen is limited in the first stage regenerator so combustion is incomplete, and some of the oxygen is provided from a second flue gas from the second stage regenerator. Some of the oxygen is also provided in air or other gases from an air grid. The first stage regenerator is positioned directly over a second stage regenerator, where a top of the second stage regenerator separates the first and second stage regenerators. The first stage regenerator has a larger diameter than the second stage regenerator, so a first combustion chamber of the first stage regenerator is divided into a cylindrical section that is directly over the top, and an annular section that surrounds the cylindrical section. A plurality of vent tube transport the second flue gas from the second stage regenerator through the top to the first stage regenerator. The vent tubes are configured to disperse the second flue gas into both the cylindrical section and the annular section of the first combustion chamber. The second flue gas discharged from the vent tubes and the gas discharged from the air grid combine with combustion gases produced in the first stage regenerator and produce a first flue gas. Discharging the second flue gas and the gas from the air grid into both the cylindrical section and the annular section of the first combustion chamber produces a more consistent superficial gas velocity in the first combustion chamber, which reduces the superficial gas velocity in the area directly over the top and increases the superficial gas velocity in the area that is not directly over the top. The amount of entrained catalyst increases exponentially with the superficial gas velocity, as mentioned above, so the more consistent superficial gas velocity throughout the first combustion chamber reduces areas with very high superficial gas velocity and thereby reduces the total amount of entrained catalyst and the associated abrasion.

Figure 1:
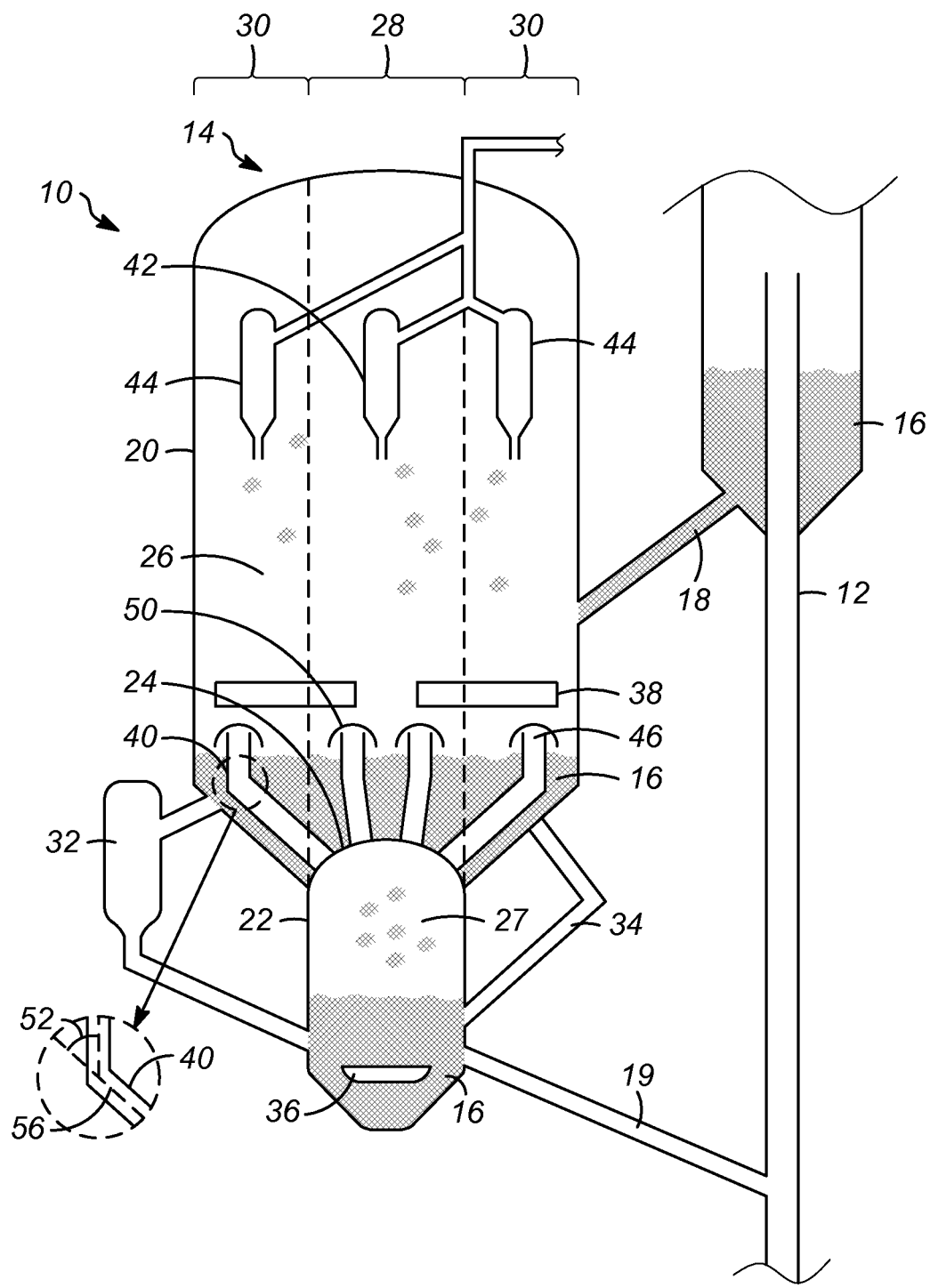
FIG. 1 is a cross-sectional view of an exemplary embodiment of a portion of a residue fluid catalyst cracking unit including a regenerator complex.

Reference is made to the exemplary embodiment illustrated in FIG. 1. A residue fluid catalyst cracker 10 (RFCC) includes a riser 12 and a regenerator complex 14. Catalyst 16 that has been deactivated in the riser 12 flows into the regenerator complex 14 through a spent catalyst transfer line 18. The catalyst 16 is regenerated in the regenerator complex 14 by combusting coke that has formed on the catalyst 16 from an FCC reaction in the riser 12. The catalyst 16 that has been regenerated then flows back to the riser 12 through a regenerated catalyst transfer line 19 where it is re-used to catalytically crack hydrocarbons, as understood by those skilled in the art. Cracked hydrocarbons from the riser 12 are collected and fractionated into various useful materials in a fractionator (not illustrated).

The catalyst 16 is heated as the coke is combusted, and the heat from the catalyst 16 aids in the endothermic cracking reaction in the riser 12, as mentioned above. Coke is deposited on the catalyst 16 in the riser 12, and the process is repeated. Several different catalysts 16 are suitable for an RFCC unit, as understood by those skilled in the art. Suitable catalysts 16 for use herein include high activity crystalline alumina silicate and/or zeolite, which are dispersed in a porous inorganic carrier material such as silica, aluminum, zirconium, or clay. An exemplary embodiment of a catalyst 16 includes crystalline zeolite as the primary active component, a matrix, a binder, and a filler. The zeolite ranges from about 10 to about 50 weight percent of the catalyst, and is a silica and alumina tetrahedral with a lattice structure that limits the size range of hydrocarbon molecules that can enter the lattice. The matrix component includes amorphous alumina, and the binder and filler provide physical strength and integrity. Silica sol or alumina sol are used as the binder and kaolin clay is used as the filler.

The regenerator complex 14 includes a first stage regenerator 20 and a second stage regenerator 22 that facilitates control of the temperature of the catalyst 16. The first stage regenerator 20 is positioned above the second stage regenerator 22, where the second stage regenerator 22 includes a top 24 positioned between the first and second stage regenerators 20, 22. In an aspect, the top 24 may be configured as a dome. The first stage regenerator 20 includes a first combustion chamber 26, the second stage regenerator 22 includes a second combustion chamber 27, and the top 24 is positioned between the first and second combustion chambers 26, 27. The top 24 has a top cross-sectional area, and the first combustion chamber 26 has a first combustion chamber cross-sectional area greater than the top cross-sectional area. The top cross-sectional area and the first combustion chamber cross-sectional area are measured along imaginary horizontal planes transecting the second stage regenerator 22 at a base of the top 24 and the first stage regenerator 20 at a point of maximum width, respectively. The first combustion chamber 26 is divided into a cylindrical section 28 positioned directly above the top 24, and an annular section 30 that surrounds the cylindrical section 28 so the annular section 30 extends beyond the area directly above the top 24. The annular section 30 does not include the area of the cylindrical section 28 directly above the top 24. In an exemplary embodiment, the top 24 has a diameter of about 8 meters and the first stage regenerator 20 has a diameter of about 16 meters, so the cross sectional area of the annular section 30 may be larger than the cross sectional area of the cylindrical section 28.

Coke is partially combusted from the catalyst 16 in the first stage regenerator 20, and the catalyst 16 then flows from the first stage regenerator 20 to the second stage regenerator 22. The catalyst 16 can flow through a catalyst cooler 32 or through a catalyst transfer line 34 that does not include a catalyst cooler 32, and the temperature of the catalyst 16 is managed by controlling the relative flow rates through the catalyst cooler 32 and through the catalyst transfer line 34. The average temperature of the total mass of catalyst 16 entering the second stage regenerator 22 is increased by decreasing the flow through the catalyst cooler 32 relative to the flow through the transfer line 34 that is not cooled, and a cooler catalyst charge to the second stage regenerator 22 results from increased flow through the catalyst cooler 32 relative to the flow through the uncooled transfer line 34. The remaining coke on the catalyst 16 from the first stage regenerator 20 is then combusted in the second stage regenerator 22 to produce regenerated catalyst 16. The regenerated catalyst 16 can then be transferred from the second stage regenerator 22 to the riser 12 for reuse.

The catalyst 16 in the first and second stage regenerators 20, 22 is fluidized with a gas that includes oxygen for combustion. The gas for the second stage regenerator 22 is supplied by a second air grid 36, where the gas includes oxygen. A first air grid 38 provides oxygen containing gas to the first stage regenerator 20. In an exemplary embodiment, the gas supplied by the first and second air grids 38, 36 is air, but other oxygen-containing gases could also be used. The gas provided to the first combustion chamber 26 from the first air grid 38 is relatively evenly distributed across the cross sectional area of the first combustion chamber 26. For example, the total volume of gas provided from the first air grid 38 that flows within the cylindrical section 28 of the first combustion chamber 26 may be about one fifth to about three quarters of the total volume of gas that flows within the annular section 30, with the different volumes primarily due to the larger cross sectional area of the annular section 30 relative to the cylindrical section 28.

The gas provided to the second stage regenerator 22 includes some excess oxygen, so a second flue gas produced by the coke combustion process in the second stage regenerator 22 also includes some oxygen. The second flue gas also includes combustion products, such as water and carbon dioxide, and may include nitrogen or other gases in various embodiments. The second flue gas is vented into the first combustion chamber 26 by a plurality of vent tubes 40. The second flue gas provides some of the oxygen used to combust coke from the catalyst 16 in the first stage regenerator 20, and the gas from the first air grid 38 provides the remainder of the total amount of oxygen in the first stage regenerator 20. The total amount of oxygen is limited so that the coke is only partially combusted from the catalyst 16 in the first stage regenerator 20. The combined gas flow from the first air grid 38 and the vent tubes 40 fluidizes the catalyst 16 in the first stage regenerator 20.

Gas from the first air grid 38 is combined with the second flue gas and combustion gases produced in the first combustion chamber 26 to produce the first flue gas. A relatively even superficial gas velocity of the first flue gas is accomplished by directing some of the second flue gas towards or into the annular section 30, and some of the second flue gas into the cylindrical section 28. The gas from the first air grid 38 is about evenly distributed throughout the first combustion chamber cross-sectional area, as described above, and combustion gases are produced about evenly across the first combustion chamber cross-sectional area if the second flue gas and the gas from the first air grid 38 are evenly distributed. Therefore, a primary factor in producing a consistent superficial gas velocity within the first combustion chamber 26 is the discharge of the second flue gas from the vent tubes 40.

The regenerator complex 14 includes a cylindrical cyclone 42 and an annular cyclone 44 positioned near the top of the first combustion chamber 26, and includes a plurality of cylindrical cyclones 42 and annular cyclones 44 in many embodiments. The cylindrical and annular cyclones 42, 44 may be within about the top third of the first combustion chamber 26 in some embodiments. The cylindrical cyclone 42 is positioned within the cylindrical section 28 of the first combustion chamber 26, and the annular cyclone 44 is positioned within the annular section 30 of the first combustion chamber 26. The vent tubes 40 may be configured such that there is a relatively even superficial gas velocity at the cylindrical and annular cyclones 42, 44. For example, a relatively even superficial gas velocity may be a superficial gas velocity at the cylindrical cyclone 42 that is about one to about one and a half times the superficial gas velocity at the annular cyclone 44, where the superficial gas velocity is measured about 10 to about 50 centimeters below the inlet of the cylindrical and/or annular cyclones 42, 44. In an alternate embodiment, a relatively even superficial gas velocity is a superficial gas velocity at the cylindrical cyclone 42 that is about one to about two times the superficial gas velocity at the annular cyclone 44.

The vent tubes 40 are configured to evenly disperse the second flue gas within the first combustion chamber 26, where the second flue gas is discharged from a discharge point 46 of the vent tubes 40. In an exemplary embodiment the discharge point 46 of a portion of the plurality of vent tubes 40 extends into the annular section 30, and the discharge point 46 of another portion of the vent tubes 40 extends into the cylindrical section 28. The second flue gas enters the vent tubes 40 at the top 24, which is in the cylindrical section 28. However, some of the second flue gas exits the vent tubes 40 at the discharge point 46 in the annular section 30, so some of the vent tubes 40 cross over from the cylindrical section 28 into the annular section 30. Therefore, a portion of the second flue gas is directed into the annular section 30 and another portion of the second flue gas is directed into the cylindrical section 28. In an exemplary embodiment, all the vent tubes 40 include a bubble cap 50 at the discharge point 46 that redirects the second flue gas downward. The bubble cap 50 can facilitate an even gas flow out of the various vent tubes 40, where the gas flow tends to proceed essentially straight up after exiting the bubble cap 50. Therefore, positioning the discharge point 46 of a portion of the vent tubes 40 with bubble caps 50 in the annular section 30 and the discharge point 46 of the remainder of the vent tubes 40 in the cylindrical section 28 results in the relatively even distribution of first flue gas at the cylindrical and annular cyclones 42, 44, as described above. More flue gas may be discharged into the annular section 30 than into the cylindrical section 28 because the annular section 30 may have a larger cross sectional area than the cylindrical section 28, as described above. Higher flow in the annular section 30 can accomplished in various manners, such as the use of larger diameter vent tubes 40 or a greater number of vent tubes 40.

The vent tubes 40 may be designed such that there are no vent tube bends 52 more than a set amount, such as about 30 degrees, 45, degrees, or 60 degrees in various embodiments. The vent tube bend 52 is measured from a vent tube longitudinal axis 56 before and after the bend point, so zero degrees indicates a straight vent tube 40 with no bend at all. The second flue gas may include entrained catalyst 16 that is abrasive, so limiting the vent tube bends 52 can help control abrasion within the vent tubes 40. Alternatively, the vent tube bend 52 may be gradual, such as a bend radius of about 5 times, 8 times, or 10 times a vent tube diameter in various embodiments. The discharge point 46 may include a lining to limit abrasion in some embodiments.

Figure 2:
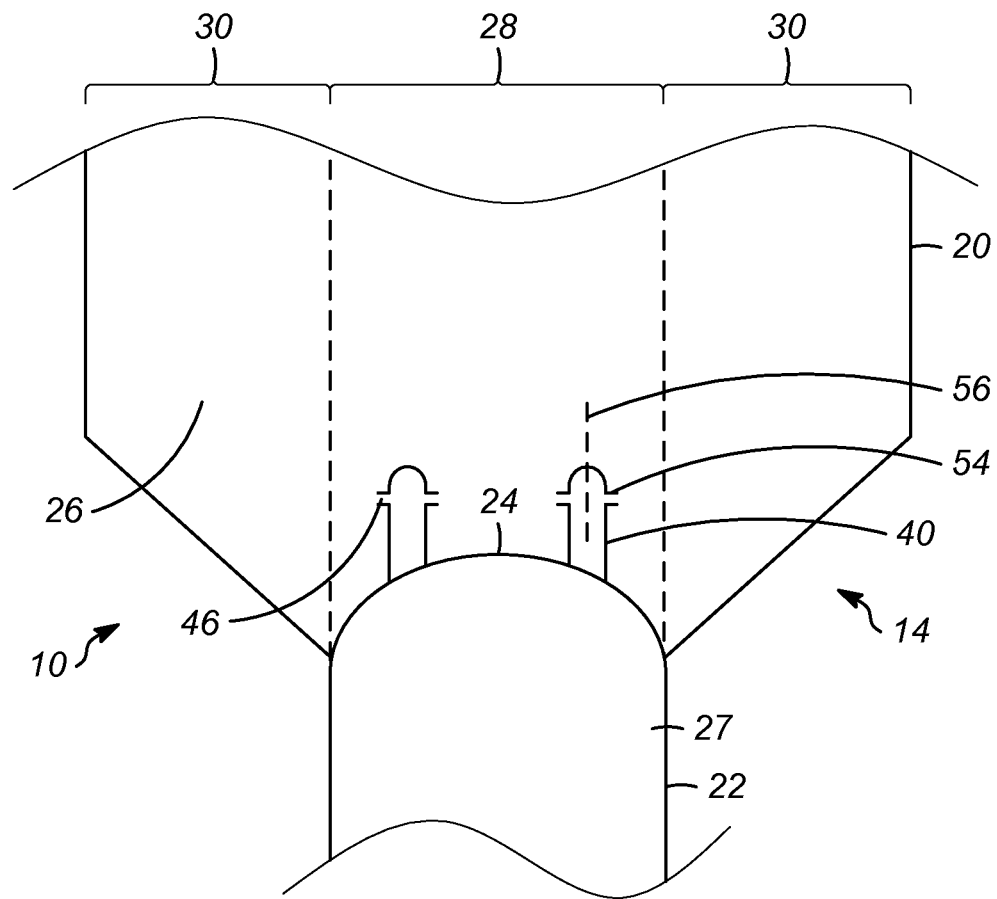
FIG. 2 is a cross-sectional view of another embodiment of a portion of a regenerator complex.
Figure 3:
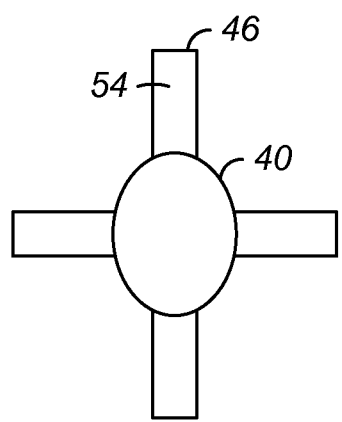
FIG. 3 is a top view of an exemplary embodiment of a riser tube.

FIGS. 2 and 3 illustrates another exemplary embodiment for dispersing the second flue gas into the annular section 30 of the first combustion chamber 26, where FIG. 2 is a sectional side view of a portion of the regenerator complex 14 and FIG. 3 is a top view of a vent tube 40. The vent tube 40 is configured with one or more side spouts 54 that direct the flue gas at an angle to the vent tube longitudinal axis 56. The side spout 54 includes a discharge point 46 for the vent tubes 40. FIGS. 2 and 3 illustrate an embodiment in which the side spout 54 vents the second flue gas at about a 90 degree angle from the vent tube longitudinal axis 56, but other angles are possible in alternate embodiments. For example, the side spout 54 may be angled to discharge the second flue gas upwards at about a 45 degree angle or at other angles, either upward or downward from the discharge point 46. The vent tube 40 can extend about vertical from the top 24, such as within about 10 degrees of vertical, and the second flue gas is expelled laterally into the annular section 30 as well as into the cylindrical section 28 by different side spouts 54. The size, angle, and number of the side spouts 54 could be adjusted to direct the desired flow rate into the annular section 30 and the cylindrical section 28 such that the superficial gas velocity of the first flue gas at the cylindrical and annular cyclones 42, 44 is about even, as described above. The exemplary embodiment illustrated in FIGS. 2 and 3 vents all of the second flue gas through the side spouts 54, so a bubble cap 50 is not needed or present. Each vent tube 40 can include four side spouts 54 in some embodiments, but the number of side spouts 54 on the vent tubes 40 can vary from one vent tube 40 to another, or can be more or less than four side spouts 54 in alternate embodiments.

Figure 4:
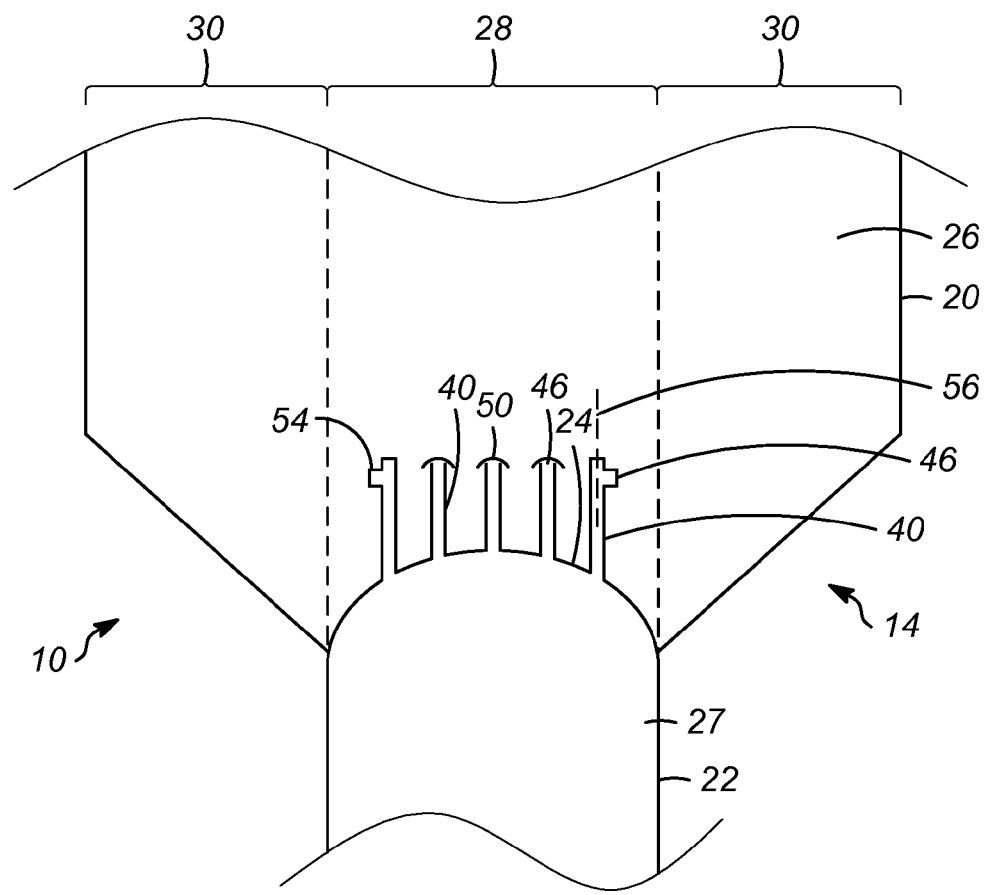
FIG. 4 is a cross-sectional view of yet another embodiment of a portion of a regenerator complex.
Figure 5:
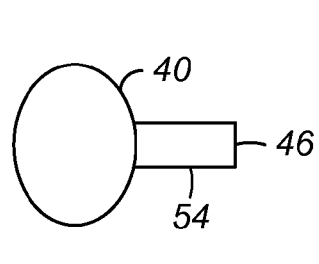
FIGS. 5 and 6 are top views of exemplary embodiments of a riser tube.
Figure 6:
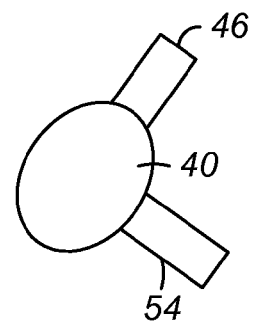

FIGS. 4-6 illustrate other exemplary embodiments for dispersing the second flue gas into the annular section 30 of the first combustion chamber 26, where FIGS. 5 and 6 are top views of different embodiments of a vent tube 40. In this embodiment, some of the vent tubes 40 include bubble caps 50, and some of the vent tubes 40 include one or more side spouts 54. The vent tubes 40, bubble caps 50, and side spouts 54 can be sized and directed to provide a relatively even flow of first flue gas within the cylindrical and annular sections 28, 30, as described above, and this produces a relatively even flow at the cylindrical and annular cyclones 42, 44. Other embodiments are also possible, such as positioning the side spout 54 within the annular section 30.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the application in any way. Rather, the foregoing detailed description will provide those skilled in the art with a convenient road map for implementing one or more embodiments, it being understood that various changes may be made in the function and arrangement of elements described in an exemplary embodiment without departing from the scope, as set forth in the appended claims.

The invention claimed is:

1. A method of regenerating a catalyst comprising the steps of:
   combusting coke from the catalyst in a second stage regenerator to produce a second flue gas, wherein the second stage regenerator comprises a second combustion chamber and a top with a top cross-sectional area;
   partially combusting the coke from the catalyst in a first stage regenerator, wherein the first stage regenerator comprises a first combustion chamber with a first combustion chamber cross-sectional area greater than the top cross-sectional area, wherein the first stage regenerator is positioned above the second stage regenerator, and wherein the top separates the first combustion chamber and the second combustion chamber such that the first combustion chamber comprises a cylindrical section directly over the top and an annular section surrounding the cylindrical section;
   venting the second flue gas into the first stage regenerator through a vent tube, wherein the vent tube comprises a discharge point; and
   dispersing a portion of the second flue gas into the annular section of the first combustion chamber by positioning the discharge point within the annular section, by venting the second flue gas from a side spout of the vent tube, or a combination thereof.

2. The method of claim 1 wherein dispersing the portion of the second flue gas comprises venting the second flue gas from the side spout of the vent tube.

3. The method of claim 2 wherein venting the second flue gas comprises venting the second flue gas through a plurality of vent tubes, wherein a portion of the second flue gas vents through the vent tube having a bubble cap and a portion of the second flue gas vents from the side spout of the vent tube.

4. The method of claim 2 wherein venting the second flue gas comprises venting the second flue gas through a plurality of vent tubes, and wherein all of the second flue gas is vented from the plurality of vent tubes each having the side spout.

5. The method of claim 4 wherein venting the second flue gas comprises venting all of the second flue gas from the plurality of vent tubes each having the side spout, wherein each of the plurality of vent tubes has four side spouts.

6. The method of claim 1 wherein:
   venting the second flue gas comprises venting the second flue gas into the first stage regenerator through a plurality of vent tubes; and
   dispersing the portion of the second flue gas comprises positioning the discharge point of a portion of the plurality of vent tubes in the annular section and positioning the discharge point of another portion of the plurality of vent tubes in the cylindrical section.

7. The method of claim 6 wherein venting the second flue gas comprises venting all the second flue gas through the plurality of vent tubes each having a bubble cap.

8. The method of claim 7 wherein venting the second flue gas comprises venting more of the second flue gas into the annular section than into the cylindrical section.

9. The method of claim 1 wherein venting the second flue gas comprises limiting a vent tube bend to about 60 degrees or less, wherein the vent tube bend is measured from a vent tube longitudinal axis before and after the vent tube bend.

10. The method of claim 1 wherein an annular cyclone is positioned in the annular section and a cylindrical cyclone is positioned within the cylindrical section, and wherein dispersing the portion of the second flue gas into the annular section comprises dispersing the second flue gas into the annular section such that a superficial gas velocity at the cylindrical cyclone is about one to about one and half times the superficial gas velocity at the annular cyclone.

11. The method of claim 1 further comprising:
    adding air to the first combustion chamber.

12. The method of claim 11 further comprising:
    fluidizing the catalyst in the first combustion chamber with the air and the second flue gas.

13. A method of regenerating a catalyst comprising the steps of:
    combusting coke from the catalyst in a second stage regenerator to produce a second flue gas, wherein the second stage regenerator comprises a second combustion chamber and a top with a top cross-sectional area;

partially combusting the coke from the catalyst in a first stage regenerator to produce a first flue gas, wherein the first stage regenerator comprises a first combustion chamber, wherein the first stage regenerator is positioned above the second stage regenerator with the top positioned between the first combustion chamber and the second combustion chamber;

separating the catalyst from the first flue gas in a cylindrical cyclone positioned over the top and within the first stage regenerator;

separating the catalyst from the first flue gas in an annular cyclone positioned within the first stage regenerator beyond the area directly over the top; and venting the second flue gas into the first combustion chamber through a vent tube such that a superficial gas velocity at the cylindrical cyclone is about one to about one and a half times the superficial gas velocity at the annular cyclone.

14. The method of claim 13 wherein venting the second flue gas comprises venting the second flue gas from a side spout of the vent tube.

15. The method of claim 14 wherein venting the second flue gas comprises venting the second flue gas through a plurality of vent tubes, wherein a portion of the second flue gas vents through the vent tube having a bubble cap and a portion of the second flue gas vents from the side spout of the vent tube.

16. The method of claim 14 wherein venting the second flue gas comprises venting the second flue gas through a plurality of vent tubes, and wherein all of the second flue gas is vented from the plurality of vent tubes each having the side spout.

17. The method of claim 16 wherein venting the second flue gas comprises venting all of the second flue gas from the plurality of vent tubes each having the side spout, wherein each of the plurality of vent tubes has four side spouts.

18. The method of claim 13 wherein venting the second flue gas comprises venting the second flue gas into the first stage regenerator through a plurality of vent tubes; and
 positioning a discharge point of a portion of the plurality of vent tubes in a cylindrical section of the first combustion chamber, wherein the cylindrical section is directly over the top; and
 positioning the discharge point of another portion of the plurality of vent tubes in an annular section of the first combustion chamber, wherein the annular section surrounds the cylindrical section.

19. The method of claim 18 wherein venting the second flue gas comprises venting all of the second flue gas through the plurality of vent tubes each having a bubble cap.

20. A catalyst regenerator comprising:
 a first stage regenerator comprising a first combustion chamber having a first combustion chamber cross-sectional area;
 a second stage regenerator comprising a second combustion chamber with a top having a top cross-sectional area less than the first combustion chamber cross-sectional area, wherein the first stage regenerator is positioned over the second stage regenerator such that a cylindrical section of the first combustion chamber is over the top, and an annular section of the first combustion chamber surrounds the cylindrical section; and
 a plurality of vent tubes extending from the second combustion chamber into the first combustion chamber through the top, wherein a portion of the plurality of vent tubes comprise a discharge point within the annular section.

\* \* \* \* \*